May 19, 1964 R. L. PITTS 3,133,306
APPARATUS FOR CLEANING AUTOMOBILE BRAKES AND BACKING PLATES
Filed Nov. 9, 1962
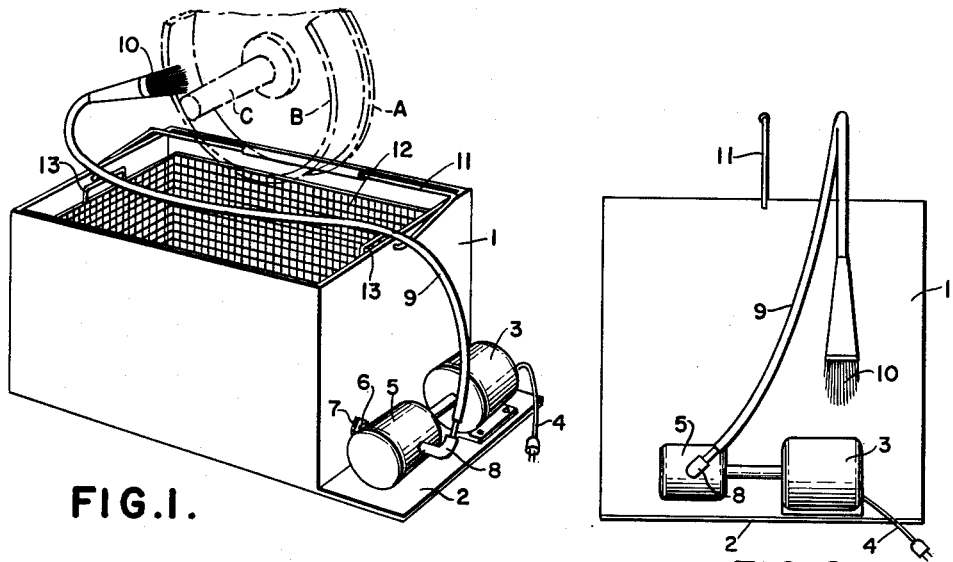
FIG.1.
FIG.2.
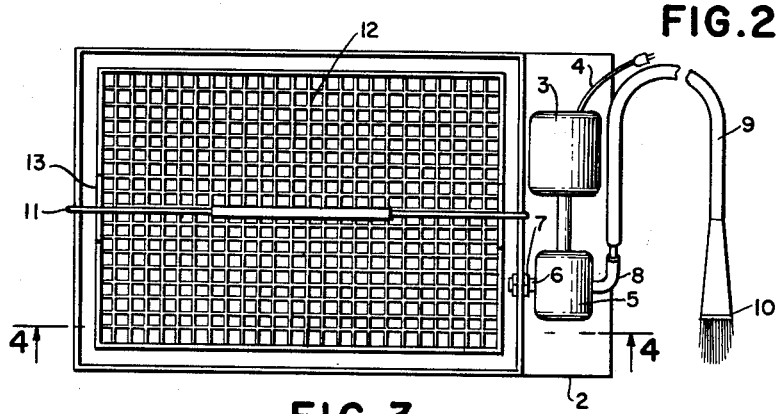
FIG.3.
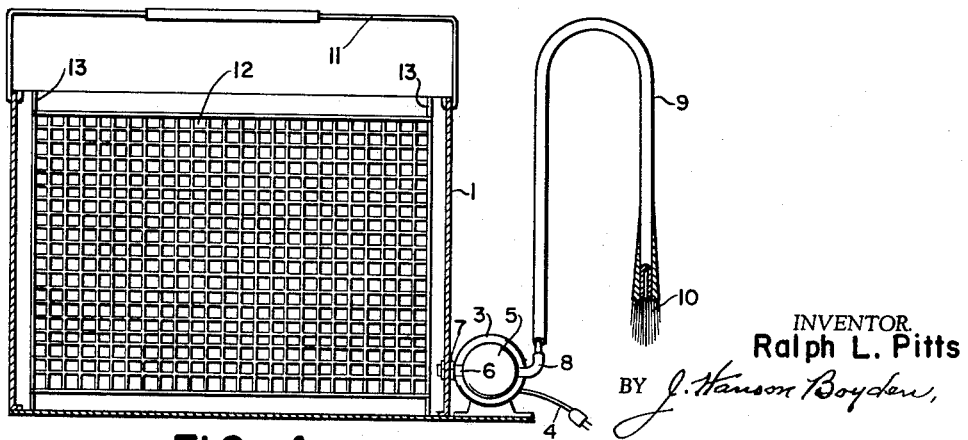
FIG.4.
INVENTOR.
Ralph L. Pitts
BY J. Hanson Boyden,
ATTORNEY

United States Patent Office 3,133,306
Patented May 19, 1964

3,133,306
APPARATUS FOR CLEANING AUTOMOBILE
BRAKES AND BACKING PLATES
Ralph L. Pitts, 820 E. Erna St., La Habra, Calif.
Filed Nov. 9, 1962, Ser. No. 236,587
2 Claims. (Cl. 15—547)

This invention relates to apparatus for cleaning the brake bands and backing plates of motor vehicles, and more particularly to relatively small and inexpensive apparatus of this character which can be used by a private automobile owner on his own premises, as well as by repair shops.

As is well known, the brake bands and backing plates of motor vehicles frequently become fouled up with grease, mud or other foreign matter which seriously interferes with the efficient operation of the brakes, and which necessitates cleaning.

An object of the invention is to provide portable cleaning apparatus which may be placed in position under the end of a motor vehicle axle, when jacked up and the wheel removed, and which will effectively clean the brake, backing plate, and associated parts.

Another object is to devise apparatus of this character in which the cleaning fluid is not discharged after the first use, but is retained in the apparatus and recycled, being used over and over again.

A more specific object of the invention is to provide such apparatus in the nature of a portable cleaning unit comprising an open top tank supporting a motor driven pump, to which is attached a flexible hose, carrying at its end a fountain brush.

With the above and other objects in view, and to improve generally on the details of such apparatus, the invention consists in the construction and combination of parts hereinafter described and claimed, and illustrated in the accompanying drawing, forming part of this specification, and in which:

FIG. 1 is a perspective view of my improved apparatus, an automobile brake shoe and backing plate being shown in broken lines;

FIG. 2 is an end elevation of the apparatus;

FIG. 3 is a plan view thereof; and

FIG. 4 is a vertical longitudinal section substantially on the line 4—4 of FIG. 3, looking in the direction of the arrows, parts of the brush being also shown in section.

Referring to the drawing in detail, my improved apparatus comprises a portable open top tank or container 1 having at one end a bracket or platform 2 on which is mounted an electric motor 3, having an extension cord 4 which may be plugged into any convenient outlet.

The motor 3 is directly coupled to a rotary pump 5 having an inlet 6 which extends through the wall of the container 1 and is secured thereto by means of nuts 7. Thus the pump is supported.

The outlet or discharge side of the pump is indicated at 8 and is shown as in the nature of an elbow fitting. To this outlet is secured one end of a flexible hose 9 carrying at its other end a fountain brush 10.

To facilitate carrying the apparatus, the tank 1 is provided at its upper edge with a swinging bail 11.

Inside of the tank, I preferably dispose a wire basket 12 which substantially fills the tank and is provided at its upper edges with handles 13 by means of which it may be lifted. This basket is for the purpose of receiving any loose small parts which may become detached from the backing plate.

Referring more particularly to FIG. 1, the usual backing plate of an automobile axle is indicated in broken lines at A, and the conventional brake shoe is indicated at B. The end of the live axle, from which the wheel has been removed, is shown at C, it being understood that in this view the axle of the vehicle has been jacked up so that the container or tank 1 may be placed directly beneath the backing plate. It will be observed that the length of the tank or container is somewhat greater than the diameter of the backing plate.

In operation, after the axle has been jacked up and the wheel removed, the tank or container is placed beneath the backing plate and brake shoe, and the latter may then be thoroughly cleaned by means of the fountain brush 10, the pump 5 serving to draw cleaning fluid from the tank and deliver it through the hose 9 to the brush. The cleaning fluid may be of any suitable kind, such, for example, as a light petroleum liquid or a detergent solution. It will be understood that the cleaning fluid discharged from the brush 10 falls back into the tank and may be recycled and used over and over, until it becomes too dirty. Any small parts which may either be removed or fall from the backing plate will be received in the basket 12, and may be readily recovered by removing this basket from the tank.

What I claim is:

1. Apparatus for cleaning brake bands and backing plates on motor vehicles while in place on the vehicles comprising an open top, portable fluid tight container having one horizontal dimension at least as large as the diameter of the backing plates to be cleaned, and being of such height that it may readily be placed beneath the backing plate when the vehicle axle is jacked up and the wheel removed, and that it may contain a body of liquid of substantial depth, a motor driven pump mounted on said container and having all parts thereof entirely outside of said container, said pump having an intake extending through a side wall of said container at a point below the level of the liquid therein, and near but substantially above the bottom, to provide a space in which sediment may accumulate below said intake, and a flexible hose extending from said pump and carrying at its free end a fountain brush, whereby said brush may be used to clean the backing plate and associated parts, and whereby the cleaning liquid, discharged from said fountain brush, falls directly back into said container, and may be recycled.

2. Apparatus in accordance with claim 1, in which a removable woven wire basket, having horizontal dimensions slightly smaller than those of said container, fits within said container and rests on and substantially covers the entire bottom thereof, to receive small parts that may become detached from the backing plate.

References Cited in the file of this patent
UNITED STATES PATENTS

| | | |
|---|---|---|
| 2,438,654 | Albertson | Mar. 30, 1948 |
| 2,573,008 | Gorden | Oct. 30, 1951 |
| 3,016,841 | Albertson et al. | Jan. 16, 1962 |

FOREIGN PATENTS

| | | |
|---|---|---|
| 206,310 | Austria | Nov. 25, 1959 |